US008228962B2

(12) United States Patent
Mortensen et al.

(10) Patent No.: US 8,228,962 B2
(45) Date of Patent: Jul. 24, 2012

(54) LOW POWER DRIVE CIRCUIT

(75) Inventors: Anders S. Mortensen, Koge (DK); Ulrich Keil, Bronshoj (DK)

(73) Assignee: IPtronics A/S, Roskilde (DK)

( * ) Notice: Subject to any disclaimer, the term of this patent is extended or adjusted under 35 U.S.C. 154(b) by 274 days.

(21) Appl. No.: 12/610,953

(22) Filed: Nov. 2, 2009

(65) Prior Publication Data

US 2010/0188013 A1 Jul. 29, 2010

Related U.S. Application Data

(60) Provisional application No. 61/167,703, filed on Apr. 8, 2009.

(30) Foreign Application Priority Data

Jan. 23, 2009 (DK) ................................ 2009 00107

(51) Int. Cl.
*H01S 3/00* (2006.01)

(52) U.S. Cl. ................................ 372/38.04; 372/38.07

(58) Field of Classification Search ................. 372/38.1, 372/38.03, 38.04, 38.07
See application file for complete search history.

(56) References Cited

U.S. PATENT DOCUMENTS 5,883,910 A * 3/1999 Link .......................... 372/38.07
6,980,575 B1 * 12/2005 Rohilla ...................... 372/38.02
8,009,709 B2 * 8/2011 Nelson ....................... 372/38.02
8,023,541 B2 * 9/2011 Nishimura et al. ............ 372/34
2003/0160636 A1 8/2003 Fattaruso
2005/0276290 A1 12/2005 Preisach
2006/0204168 A1 9/2006 Douma

FOREIGN PATENT DOCUMENTS

EP 1 445 843 8/2004
JP 04-014909 1/1992
JP 11-214781 8/1999
JP 2009-099803 5/2009

* cited by examiner

*Primary Examiner* — Thuy Vinh Tran

(74) *Attorney, Agent, or Firm* — Buchanan Ingersoll & Rooney PC

(57) ABSTRACT

The invention relates to an integrated driver circuit suitable for driving a light emitter with a signal current I(time) based on a received signal said circuit comprising a differential pair of transistors having a first transistor and a second transistor each respectively forming part of a first branch and a second branch, said first branch comprises a node suitable for connecting to said light emitter and/or said first branch comprises said light emitter, wherein said second branch comprise at least one charge storage device. This charge storage device may be arranged to collect current otherwise wasted in the process of driving the light emitter. This current may be utilized to drive circuitry thereby reduce current consumption.

38 Claims, 5 Drawing Sheets

LOW POWER DRIVE CIRCUIT

TECHNICAL FIELD

The present invention relates to an integrated driver circuit suitable for driving a light emitter with a modulated current 1(time) said circuit comprising a differential pair of transistors having a first transistor and a second transistor each respectively forming part of a first branch and a second branch, said first branch comprises a node suitable for connecting to said light emitter and/or said first branch comprises said light emitter. The invention further relates to a chip and system each comprising such an integrated driver circuit.

BACKGROUND

The demands for ever-increasing bandwidths in digital data communication equipment at reduced power consumption levels are constantly growing. These demands not only require more efficient integrated-circuit components, but also high performance interconnect structures and devices. Indeed, as one example, the International Technology Roadmap for Semiconductors (ITRS) projects that high performance chips in the very near future will have operating frequencies, both on-chip and off-chip, rising above 50 GHz. Conventional metal-wire based interconnects have played a central role in the microelectronics revolution. It is apparent that wire-based interconnect devices will be challenged to enabling even higher operating frequencies.

However, besides challenges with regard to bandwidth, the wire-based interconnect of the future may struggle significantly with a high power consumption. The power requirement of electronic components typically increase with increased bandwidth, which in some case result in increased cooling requirement which further increases power consumption of the electronic system as a whole. The power and cooling requirement may be particularly challenging to meet in data centers where larger quantities of servers are pooled and closely spaced. Such pooling inherently requires large quantities of interconnects which therefore may add significantly to the power and cooling requirements of the datacenter.

One approach to solve this problem includes utilizing optical interconnects as an alternative to wire-based interconnections as optical fibers have a significantly higher bandwidth relative to an electrical wire. It is therefore an object of the present invention to provide means for reducing the power requirement of an optical interconnect.

DISCLOSURE OF INVENTION

An optical interconnect typically comprises a driver circuit which drives a light emitter (typically with a binary signal), a waveguide (typically an optical fiber), and a receiver. In such a setup the light emitter typically consumes a significant part of the power requirement of the optical interconnect.

In a typical optical interconnect Vertical Cavity Surface Emitting Laser (VCSEL) diodes are utilized as light emitter to transmit binary data over optical fibers. However, the light source may in principle be any suitable light source and the transmitted waveform may be any suitable waveform for transmitting information. Most light emitters have a threshold current above which they substantially begin to emit light. Increasing the current driven through the emitter from zero to above said threshold may be time consuming, and therefore a bias current is typically driven through the light source. Often the bias current is set just below, at the threshold or above the threshold but it may also be set to be well above threshold. This bias current is often programmable so as the same circuit design may be utilized to drive different light emitters and/or for different applications.

Additional time varying current which modulates the emission from the light emitter is referred to as the modulation current and the sum of modulation current and the bias current is referred to as the signal current I(time). The term modulation current may also refer to the current from a current source which is used to add and/or subtract current driven to the light emitter.

In the following, embodiments of the driver will be discussed with reference to a binary signal where light transmission correspond to 1s and low amount of light (such as zero) is transmitted corresponding to 0s. During 0s a bias current $I_{BIAS}$ (possibly zero) is driven through the light emitter and during 1s $I_{BIAS}$ plus a modulation current $I_{MOD}$ driven through the light emitter. As will be appreciated by the skilled person this may be an idealization as a real world signal may comprise deviations from an ideal binary signal. Furthermore, as noted above, the present invention is not limited to a binary signal.

Typically, the current driven to the light emitter is provided by a driver circuit adapted to provide a current output based on a differential input controlling whether (in the binary case) to provide a bias current or a bias current plus a modulation current. In order to provide a high bandwidth driver these currents are typically provided by a set of current sources which may be considered fixed at least relative to the data rate for which the driver is designed. The change in the current driven through the light emitter is obtained via shifting states of transistors in the driver circuit. Therefore, in one embodiment the invention relates to an integrated driver circuit suitable for driving a light emitter with a signal current I(time) based on a received signal said circuit comprising a differential pair of transistors having a first transistor and a second transistor each respectively forming part of a first branch and a second branch, said first branch comprises a node suitable for connecting to said light emitter and/or said first branch comprises said light emitter, wherein said second branch comprises at least one charge storage device suitable for supplying current to one or more external components. In this way the charge storage device may collect current unused by the light emitter. In order to save power such collected charges may be applied to supply current to external components such as other components of the driver, of the optical interconnect or yet other parts of the system in which the interconnect is integrated. One example of other components of the interconnect is a receiver circuit located at the same end of the interconnect as the driver. Typically said signal will comprise information such as a binary data stream and is received by the driver circuit as a differential voltage signal.

In the context of the present invention the term driver circuit, also referred to as a differential stage, refers to circuit driving current through the light emitter as a function of a differential input to the driver circuit whereas the term driver may refer to a more extended system suitable for receiving an input and providing a signal current for a light emitter. In one embodiment driver circuit is said to form the circuit determining the signal current driven to the light emitter based on a signal provided to the gates of the differential pair of transistors. Beside the driver circuit a driver may for example comprise components suitable for receiving, amplifying, rectifying or otherwise filtering the input to the driver.

In the context of the present invention the term external components refer to components not comprised in the differential stage of the driver. External components may be other parts of the driver, such as components for pre-amplification, filtering etc. or components external to the driver as such either on the same chip as the driver circuit and/or exterior to the chip comprising the driver. The driver circuit may be said to have a transfer function describing the relation between the signal driving the gates or bases of the first and second transistors and the current from the driver circuit driven to the light emitter. An external component is a component where it may be said that this transfer function is substantially independent of the external component. In the following, gate or base is used interchangeable unless the specific type of transistor is discussed.

In one embodiment external components may be selected from the following group of circuitry and components: high speed amplifiers, pre-emphasis circuitry, digital control circuitry, analog control circuitry, operational amplifiers, external chips such as microcontrollers, receiver circuits, encoding and/or decoding circuitry and/or a buffer. Here "high speed" refer to components arranged to handle the signal path. In one embodiment substantial all components of the signal path of the driver utilizes the charge storage device as power supply. In one embodiment the driver circuit form part of a transceiver either integrated on the same die or via multiple chips. In one embodiment the charge storage device is arranged to function as a power supply for at least part of the receiver circuit.

In general the term node is to be understood as a point where a light emitter may be connected to driver circuit either directly or through intermediary wires or circuitry. The light emitter may be integrated along with the driver circuit but often the light emitter and the driver circuit are provided as, or part of, separate components. Therefore, in one embodiment the term node refers to a point in the driver circuit connect to component, such as a bump pad or a wire bond pad, suitable for external connection to a light emitter. In one embodiment the light emitter will be connected in parallel to the first branch via a node whereas in one embodiment the light emitter will be connected in series with said first branch. In one embodiment the light emitter is integrated with the driver circuit in series with the first branch and may therefore be said to form part of said first branch.

In one embodiment the invention relates to a chip comprising an integrated driver circuit according to the invention. In one embodiment the chip comprises external components. In one embodiment the charge storage device is able to supply a significant portion of the current required to operate such components and therefore provide a reduction of the current requirement of the chip. Accordingly, in one embodiment, during operation, said light emitter is arranged to have a current requirement $I_{req,emit}$ and said chip is arranged to have a current requirement $I_{req,chip}$, where $I_{req,chip}$ comprises $I_{req,emit}$ and $I_{req,chip} \leqq 1.5\ I_{req,emit}$, such as $I_{req,chip} \leqq 1.4\ I_{req,emit}$, such as $I_{req,chip} \leqq 1.3\ I_{req,emit}$, such as $I_{req,chip} \leqq 1.2\ I_{req,emit}$, such as $I_{req,\ chip} \leqq 1.1\ I_{req,emit}$, such as $I_{req,chip} \leqq 1.05\ I_{req,emit}$, such as $I_{req,chip} \leqq 1.01\ I_{req,emit}$, such as $I_{req,chip} \leqq 1.005\ I_{req,emit}$, such as $I_{req,chip} = I_{req,emit}$. In one embodiment, the chip may comprise a plurality of driver channels and/or other components such as receivers, signal processors, encoders etc. not directly related to the driver circuit. So in one embodiment the comparison of the current requirements of the light emitter and that of the driver circuit is related to the driver portion relating to the same driver circuit.

In one embodiment the invention relates to a system comprising a light emitter, one or more components suitable for providing a signal and an integrated driver circuit according to the invention.

DETAILS OF THE INVENTION

As explained above a driver circuit often provides the variation of the signal current, i.e. current driven through the light emitter, by shifting the flow of current from a set of current sources. Such current sources are often adjustable or programmable to allow the driver circuit design to be applied to different applications and/or to drive different light emitters. In one embodiment at least one of the current sources of the driver circuit is programmable, such as programmable by switching on a desired number of current sub-sources. In one embodiment at least one current source is programmable to allow compensation of effects induced by environmental factors and/or aging of the circuit and/or the light emitter.

In one embodiment, the driver circuit is arranged to provide a signal current by combining currents from two current sources. In such one embodiment one source provides an offset current $I_{OFFSET}$, referred to as an offset current source, whereas the other provides $I_{MOD}$, referred to as a modulation current source. In one embodiment the current of the two sources are added when transmitting 1s whereas the current from a single current source is driven through the light emitter when transmitting 0s. In this case the offset current corresponds to the bias current. In one embodiment the current of one source are driven through the light emitter when transmitting 1s whereas the current from the second current source is subtracted when transmitting 0s. In this case the offset current source supplies the bias current plus the modulation current and the modulation current is subtracted when transmitting 0s. As mentioned above the present invention is not limited to drivers providing a binary signal. For example, the present embodiment may be modified to enable a multilevel signal e.g. by adding or subtracting fractions of the current from the modulation current source or by combining more than two current sources.

In one embodiment the charge storage device is connected in series with the second transistor, so that current passing the second transistor will be at least partly collected by the charge storage device. In one embodiment the charge storage device is connected in series with a current source so that current from this source may at least partly be applied to charge the charge storage device. In one embodiment said current source is the modulation current source. In one embodiment the charge storage device is series in with a current source mentioned as well as the second transistor. In this way the second transistor may be applied to guide at least part of the current from the modulation current source to be collected in the charge storage device when this current is not required in driving the light emitter. In one embodiment said driver circuit is arranged to receive a supply current $I_{sup}$(time) where said circuit is arranged so that at least part of the current $I_{sup}$(time)−I(time) charges said charge storage device. Here the supply current $I_{sup}$(time) is the current that the driver circuit draws from the supply during use including the current supplied to the light emitter. In one embodiment $I_{sup}$(time) is substantially constant at least relative to the bandwidth of the signal current which the driver circuit is intended to transmit. As an example, this means that changes in $I_{sup}$(time) due to changes such as age or temperature of the circuit and/or the light emitter are ignored when the current is regarded as substantially constant. In one embodiment $I_{sup}$(time) varies substantially along with the current supplied to light emitter. According to the invention at least part of the difference between the current supplied to the driver circuit light emitter and that fed to the battery, i.e. $I_{sup}$(time)−I(time), may be applied to charge the charge storage device. In one embodiment the remaining difference may be applied to drive one or more components of the driver or directed to ground.

In one embodiment the driver is arranged to provide a signal current to said light emitter having a low value and a high value and said charge storage device is arranged to be primarily charged when said low value is supplied to light emitter. In one embodiment said signal current is a binary signal current and said high and low signals correspond to sending light (commonly corresponding to 1s) and substantially no light (commonly corresponding to 0s), respectively. Whereas in another embodiment the driver is arranged to provide a signal current to said light emitter having a low value and a high value and said charge storage device is arranged to be primarily charged when said high value is supplied to the light emitter. This means that in one embodiment charges of the charge storage device will substantially occur in segments. In one embodiment said at least part of the current $I_{sup}$(time)−I(time) may be zero in time segments. In one embodiment substantially all of the current supplied to the circuit are in time segment supplied to the light emitter so that $I_{sup}$(time)−I(time) is substantially zero.

In one embodiment the driver circuit is arranged to operate substantially as a binary driver circuit wherein said first and second transistors are substantially active also referred to as on only when the other transistor is substantially inactive also referred to as off. However, in one embodiment an amount of current may pass the inactive transistor. For bipolar transistors the emitter current is often modeled as proportional to exponential functions which by definition cannot be zero so, assuming correspondence to such a model, some current will be supplied to the charge storage device regardless of the signal. Similarly the drain current of CMOS transistors are commonly modeled as proportional to square functions. This often requires much higher signal amplitude relative to bipolar devices to switch current from one branch to the other to the same degree. Often signal amplitude will be limited so that some current will be supplied to the charge storage device regardless of the signal. In one embodiment this may allow charging of the charge storage device outside the period where it is being primarily charged. In one embodiment primarily charged is taken to mean that the ratio of the current supplied to said charge storage device when it is not being primarily charged relative to the current supplied to said charge storage device when it is being primarily charged is equal to or less than 1, such equal to or less than $10^{-1}$, such as equal to or less than $10^{-2}$, such as equal to or less than $10^{-3}$, such as 0.

As one object of the present invention is to provide a low power driver circuit suitable for optical interconnect one embodiment of the driver circuit is suitable for providing a signal current having an upper bandwidth equal to or exceeding 1 GHz, such as equal to or exceeding 2 GHz, such as equal to or exceeding 4 GHz, such as equal to or exceeding 6 GHz, such as equal to or exceeding 8 GHz, such as equal to or exceeding 10 GHz, such as equal to or exceeding 12 GHz, such as equal to or exceeding 14 GHz, such as equal to or exceeding 16 GHz, such as equal to or exceeding 18 GHz, such as equal to or exceeding 20 GHz, such as equal to or exceeding 22 GHz, such as equal to or exceeding 25 GHz, such as equal to or exceeding 30 GHz, such as equal to or exceeding 35 GHz, such as equal to or exceeding 40 GHz, such as equal to or exceeding 50 GHz, such as equal to or exceeding 100 GHz. In one embodiment is suitable for providing a signal current having an lower bandwidth of less than or equal to 1 GHz, such as less than or equal to 100 MHz, such less than or equal to 1 MHz, such less than or equal to 500 kHz, such less than or equal to 50 kHz, such as less than or equal to 1 kHz, such as less than or equal to 500 Hz, such as less than or equal to 50 Hz, such as DC. In one embodiment said driver circuit is suitable for providing a signal current comprising a binary signal of 100 Mbit or more, such as 1 Gbit or more, such as 2 Gbit or more, such as 5 Gbit or more, such as 8 Gbit or more, such as 10 Gbit or more, such as 12 Gbit or more, such as 24 Gbit or more, such as 50 Gbit or more.

In one embodiment the second branch comprises a node for supplying electrical circuitry with current accumulated in said charge storage device, said note residing at a potential VDDI. To establish VDDI as a stable potential relative to ground, the charge storage device is in one embodiment connected to a reference voltage. In the present context a reference voltage is voltage that reflects the VDD or ground potential, either directly or indirectly. However, it may also be possible to supply external components via VDDI in combination with an additional node at the opposite side of the charge storage device relative to VDDI. In the following the variations of VDDI is discussed and in cases where two nodes are applied the variation of VDDI refers to the variation of the potential between the two nodes.

In one embodiment the driver circuit is arranged so that during operation VDDI resides within a potential interval. In one embodiment driver circuit is arranged so that during operation VDDI varies less than 20%, such as less than 10%, such as less than 5%, such as less than 1%. Such confinement to an interval of VDDI enables the use of the charge storage device as a current supply or power supply for external components. In one embodiment the term power supply is in this context taken to mean that in use current may be drawn from the charge storage device while maintaining a substantial constant voltage across the charge storage device. In this context "substantially constant" is in one embodiment taken to mean the variation regarding VDDI discussed above. In one embodiment said variation is considered within frequencies that are low relative to the mean bandwidth of the signal, such as less than 75% of the bandwidth of the signal, such as less than 50%, such as less than 25%, such as less than 10%, such as less than 5%, such as less than 1%, such as less than 0.5%, such as less than 0.1%, such as less than 0.01. In one embodiment said variation is considered within frequencies that are lower than 1 GHz, such as less than or equal to 750 MHz, such as less than or equal to 500 MHz, such as less than or equal to 250 MHz, such as less than or equal to 100 MHz, such as less than or equal to 75 MHz, such as less than or equal to 50 MHz, such as less than or equal to 25 MHz, such as less than or equal to 10 MHz, such less than or equal to 1 MHz, such less than or equal to 500 kHz, such less than or equal to 50 kHz, such as less than or equal to 1 kHz, such as less than or equal to 500 Hz, such as less than or equal to 50 Hz.

In one embodiment said second branch further comprises a regulator arranged to influence VDDI. In one embodiment the driver circuit further comprises a regulator connected in parallel to said charge storage device, said regulator being arranged to influence VDDI. In one embodiment such a regulator may supply or draw current in order to obtain the desired value for VDDI. In one embodiment such a regulator holds VDDI to the desired value and/or the desired interval. Accordingly, in one embodiment said regulator is a voltage regulator and/or a current regulator. In one embodiment the charge storage device will be empty prior to starting the circuit. This may provide a challenge as some external components supplied by the charge storage device during operation may be required during initialization of the circuit. As an example an external component may be a pre-amplifier which does not allow the signal to pass without a supply current;

however, in one embodiment the charge storage device is charged, e.g. via the regulator, prior to the driver driving signal current to the light emitter. In one embodiment a component or circuit, such as the regulator, supplies the required current when the charge storage device is empty. In one embodiment a regulator is applied to ensure that VDDI is obtained during an initialization of the circuit.

In one embodiment said regulator is constructed as a voltage follower. In one embodiment said regulator may supply current via a current source, such as a current source comprising a set of current sub-sources which may be digitally controlled.

Often the regulator requires at least one input in form of a measurement in order to determine the appropriate regulation. However, in one embodiment the charging of the charge storage device may be substantially deterministic so that regulation may be based on a predetermined schedule. Such an embodiment may be applicable in a system where the signal to be transmitted is encoded so that over suitable time scale a known average signal is to be transmitted. As will be realized by a skilled person any suitable measurement may be applied to obtain an indicator of either the status of the charge storage device (such as the potential drop over the charge storage device), the indicator of the charging and/or discharging of the charge storage device (such as the current in the second branch). In one embodiment the regulator is arranged to regulate based on one or more measurements selected from the group of VDDI, the current in the first branch, the current in the second branch, the signal current, potential over the light emitter, potential at the base of said first transistor, potential at the base of said second transistor.

In one embodiment the upper bandwidth of said regulator is arranged to be substantially less than the upper bandwidth of the signal current so that regulator functions to influence average values. In one embodiment bandwidth of said regulator is less than or substantially equal to 1 GHz, such as less than or equal to 750 MHz, such as less than or equal to 500 MHz, such as less than or equal to 250 MHz, such as less than or equal to 100 MHz, such as less than or equal to 75 MHz, such as less than or equal to 50 MHz, such as less than or equal to 25 MHz, such as less than or equal to 10 MHz, such less than or equal to 1 MHz, such less than or equal to 500 kHz, such less than or equal to 50 kHz, such as less than or equal to 1 kHz, such as less than or equal to 500 Hz, such as less than or equal to 50 Hz, such as DC.

In one embodiment charge storage device comprises a capacitor, which facilitates relatively simple integration and a long life-time. In one embodiment the charge storage device comprises a battery. A rechargeable battery may carry a substantially constant charged when not in use which may be useful to facilitate a simplified startup procedure. Furthermore, a battery may maintain a relatively stable potential and may therefore in one embodiment exhibit low drift for signals with low frequency content and in one embodiment a battery may provide a higher power saving as less regulation is required to maintain a substantially stable potential. However, a battery will often be an external component and therefore provide a more complex implementation relative to e.g. a capacitor. Also, a battery may have a limited life time and therefore require exchange or impose a limited life time of the driver circuit.

In one embodiment the first and second transistors are selected from the group of PMOS, NMOS, NPN and PNP. While exceptions may occur due to technological progress, MOS transistors is generally known in the art to tolerate a smaller supply headroom relative to bipolar transistors. On the other hand bipolar transistors are known to require less power to drive a transition of the transistor and have a higher output impedance. Due to a higher charge-carrier mobility of electrons relative to holes in most semiconductor materials NPN and NMOS are known in the art to have a higher upper bandwidth than the corresponding PNP and PMOS transistors—all else equal. The choice of transistor commonly depends on a combination of the requirements of the application and the available process technology and its cost.

In principle the light emitter may be any suitable type for sending signals via the light carrier of the system, such as an optical fiber or a planar waveguide. It is often preferable that the light emitter has one or more of a low power consumption, a fast response time, easy integration and a low cost. In one embodiment light emitter is selected from the group of VCSEL, a photodiode, a laser, a laser diode and a Mach-Zender modulator.

As discussed above, in one embodiment the present invention relates to a chip comprising a driver circuit. In one embodiment this driver circuit comprises any of the features of the driver circuit discussed above. Besides said driver circuit, a chip may further comprise one or more components regarded as external relative to the driver circuit. Such external components may as an example comprise components or circuits such as other driver circuits allowing for driving multiple light emitters and/or function as a back-up driver circuit, one or more receivers so that the chip may function as a transceiver and/or one or more components for pre-processing of the signal and/or any of the examples of external components provided above. In one embodiment the charge storage device of the driver circuit is arranged to supply current to one or more external components integrated on said chip. In the following reference to external components refers to external components being supplied from the charge storage device. In one embodiment one or more of said external component(s) are connected to the base or gate of said first and/or second transistors. As discussed above, in one embodiment the driver circuit is arranged to form said signal current based on a signal wherein at least one of said external components functions as a pre-processor of said signal.

In the present invention the phrase "connect to" is taken to mean that the two components are in electrical communication but in one embodiment this does not exclude intermediate components. In one embodiment "connected to" is taken to mean a direct electrical connection where the two components are connected via wires, transmissions lines, bond connections or the like.

In the context of the present invention a signal may in principle be any signal. For typical applications of optical interconnect the signal is likely transmitted towards the driver circuit from some sort of controller. In one embodiment the controller and the driver circuit are integrated on the same chip. In principle the controller may obtain the signal to be transmitted from any suitable source, such as a hard-drive, a CPU, a GPU, RAM memory or ROM memory. The controller may be integrated or external to the source.

In one embodiment the charge storage device is arranged to supply current to all external components relating to the driver circuit. In one embodiment the chip comprise a DC-level shifter and said external components comprise all pre-processor components prior to said level shifter. In one embodiment the storage device is arranged to supply current to one or more external components not relating to the driver circuit and/or not connected to said driver circuit. In this context prior refers to the intended flow of the signal from transmittance to the chip and driving of the signal (via current) to the light emitter. In one embodiment the external component(s) requires a supply current $I_{req}$ wherein said charge storage device is arrange to provide all or part of $I_{req}$, such as more than 10%, such as more than 20%, such as more than 30%, such as more than 40%, such as more than 50%, such as more than 60%, such as more than 70%, such as more than 80%, such as more than 90%, such as 100%.

As discussed above, in one embodiment the invention relates to a system comprising a driver circuit. In one embodiment said driver circuit comprises any of the features to the driver circuit discussed above. In one embodiment the system comprises a chip comprising any of the features of the chip discussed above. In one embodiment the system form part of an optical interconnect. As discussed with regard to the chip external components which are supplied by the charge storage device may be integrated along with the driver circuit. However, in one embodiment external components comprise components not integrated with the driver circuit.

BRIEF DESCRIPTION OF DRAWINGS

The invention will be explained more fully below in relation to the following embodiments and with reference to the drawings in which.

The figures are schematic and may be simplified for clarity. Furthermore, for simplicity the discussion, unless otherwise specified, assumes idealized components with no losses. Throughout, the same reference numerals are used for identical or corresponding parts.

Further scope of applicability of the present invention will become apparent from the detailed description given hereinafter. However, it should be understood that the detailed description and specific examples, while indicating embodiments of the invention, are given by way of illustration only, since various changes and modifications within the spirit and scope of the invention will become apparent to those skilled in the art from this detailed description.

In the following examples two current sources are applied to supply offset current $I_{OFFSET}$ and modulation current $I_{MOD}$, respectively. Strictly speaking the offset current and modulation current is defined by current driven to the light emitter and not by the current supplied by the current sources but, unless otherwise specified, the same term is applied.

Figure 1:
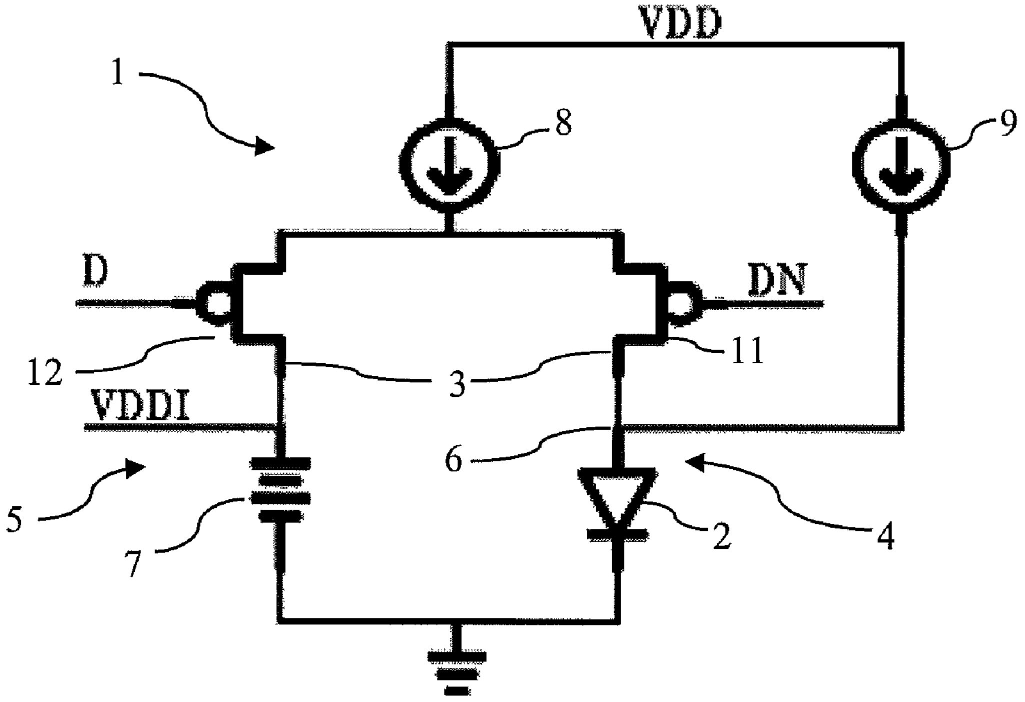
FIG. 1 shows a driver circuit according to the invention based on P-channel MOSFET transistors.

FIG. 1 shows a driver circuit 1 according to the invention arranged to drive a light emitter 2. The transistors 3 are of the type P-channel MOSFET. The first branch 4 comprises the node 6 connecting the driver circuit to the light emitter 2. The second branch 5 comprises the charge storage device 7 here exemplified as a battery. The gates of the transistors 3 are marked as D and DN for data and data-not, respectively; indicating that the differential pair formed by the transistors 3 is arranged to receive a differential data signal. When D is low (and DN is high), e.g. corresponding to a binary "0", the gate of the transistor 12 leaves the path from source to drain is open and the reverse is true for the transistor 11. This allows the current from the modulation current source 8 to be driven through the second branch and charge the battery while the offset current source is driven through the light emitter 2. When D is high (and DN is low) the transistor 12 leaves the path from source to drain closed and the reverse is true for the transistor 11. This allows the sum of the currents from the modulation current source 8 and the offset current source 9 to be driven through the light emitter 2 while no current is driven to the battery. Accordingly, this embodiment of the driver circuit charges the charge storage device when D is low and $I_{OFFSET}=I_{BIAS}$. It is also noted that this driver circuit has a substantially constant current consumption of $I_{BIAS}+I_{MOD}$. In the case where D is substantially equally high and low as a function of time the charge storage will on average be charged with half the modulation current. In one embodiment the driver circuit is integrated with other circuits such as other driver circuits and/or one or more receivers. In such an embodiment and other embodiments it may be advantageous that the current consumption is constant or substantially so e.g. to minimize cross-talk through the supply.

Figure 2:
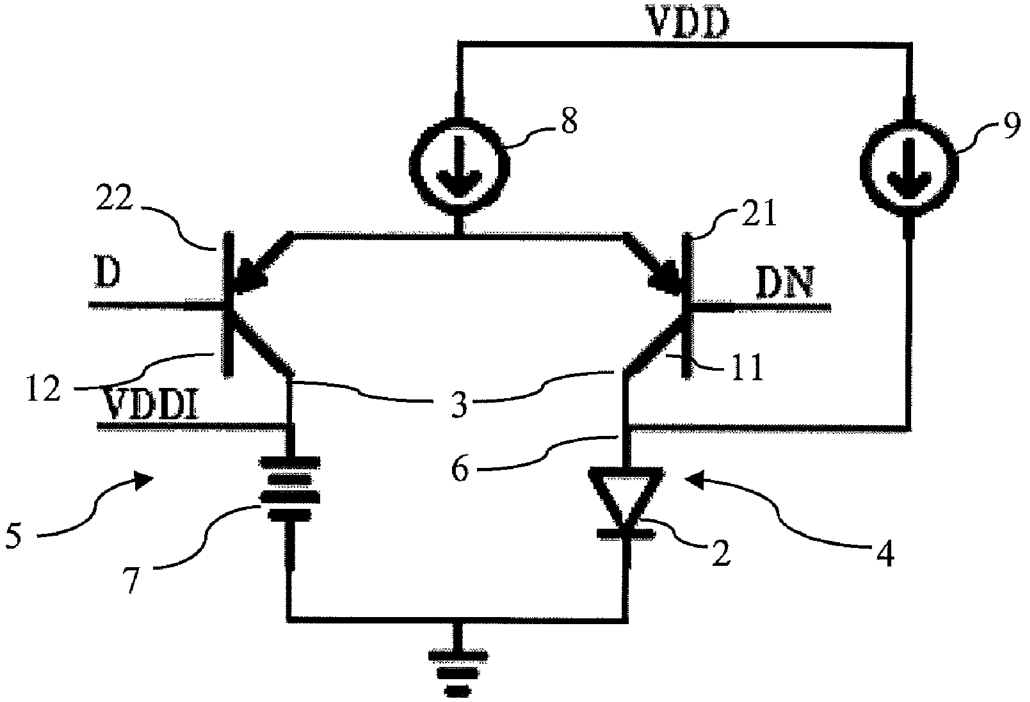
FIG. 2 shows a driver circuit according to the invention based on PNP bipolar transistors.

FIG. 2 shows an embodiment of a driver circuit according the invention based on N-type bipolar transistors 21 and 22. Relative to the embodiment shown in FIG. 1 the functionality is substantially similar apart mutatis mutandis features relating to the transistor type.

Figure 3:
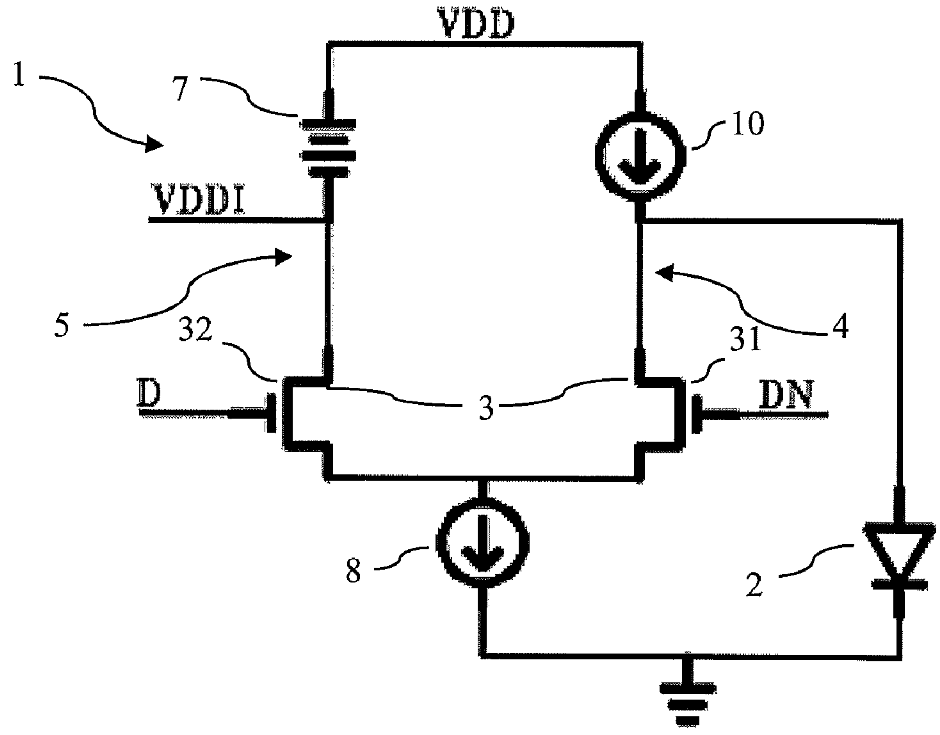
FIG. 3 shows a driver circuit according to the invention based on N-channel MOSFET transistors.

FIG. 3 shows an embodiment of a driver circuit according the invention based on N-channel MOSFET transistors 31 and 32. When D is high (and DN is low) the gate of the transistor 32 opens the path from source to drain and the reverse is true for the transistor 31. This drives the current from the modulation current source 8 through the second branch 5 allowing it to charge the charge storage device 7, while the current from the offset current source 10 is driven through the light emitter. In one embodiment the offset current source is set to supply the bias current plus the modulation current. When D is low (and DN is high) the gate of the transistor 32 close the path from source to drain and the reverse is true for the transistor 31. This allows the modulation current source to drive the modulation current through the transistor 31 so that the offset current minus the modulation current is driven through the light emitter. Accordingly, $I_{OFFSET}=I_{BIAS}+I_{MOD}$. When D is high this embodiment has a current consumption of $I_{OFFSET}+I_{MOD}=I_{BIAS}+2I_{MOD}$, whereas the current consumption drops to $I_{OFFSET}$ D is low. In one embodiment the probability of D being low and high is equal, at least one average. In this case the circuit has an average current consumption $I_{BIAS}+1.5I_{MOD}$ and the charge current device is charged by one half of the modulation current.

Figure 4:
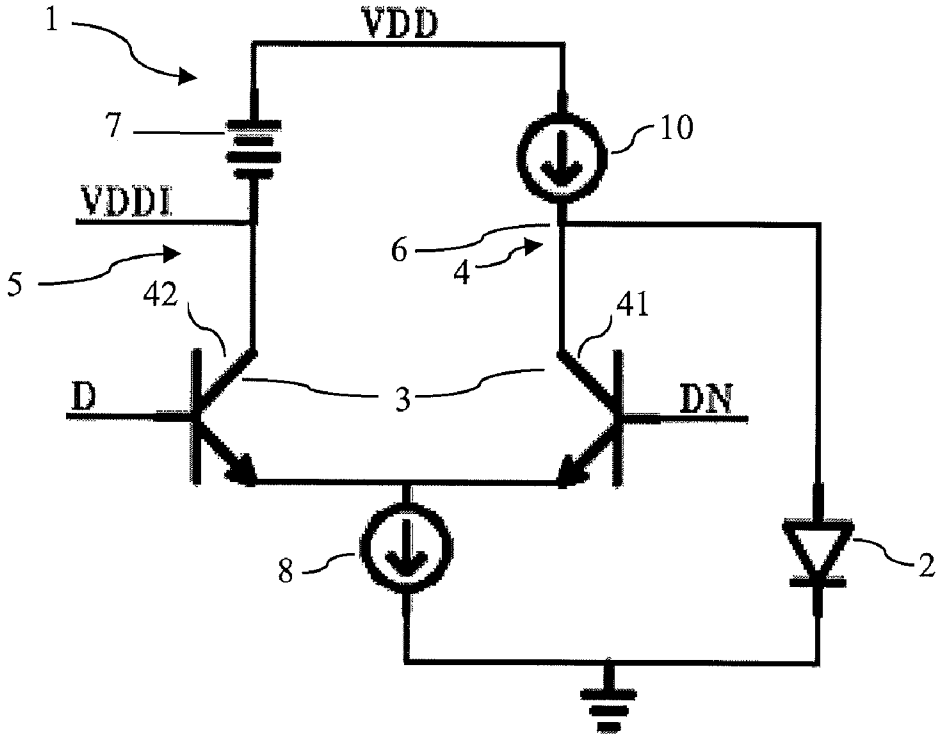
FIG. 4 shows a driver circuit according to the invention based on NPN bipolar transistors.

FIG. 4 shows an embodiment of a driver circuit according the invention based on N-type bipolar transistors 41 and 42. Relative to the embodiment shown in FIG. 3 the functionality is substantially similar mutatis mutandis features relating to the transistor type.

For the circuits of FIGS. 1 to 4 the light emitter as grounded on the cathode. In one embodiment the driver circuit is applied to drive a light emitter array with common cathode such as a VCSEL array.

Figure 5:
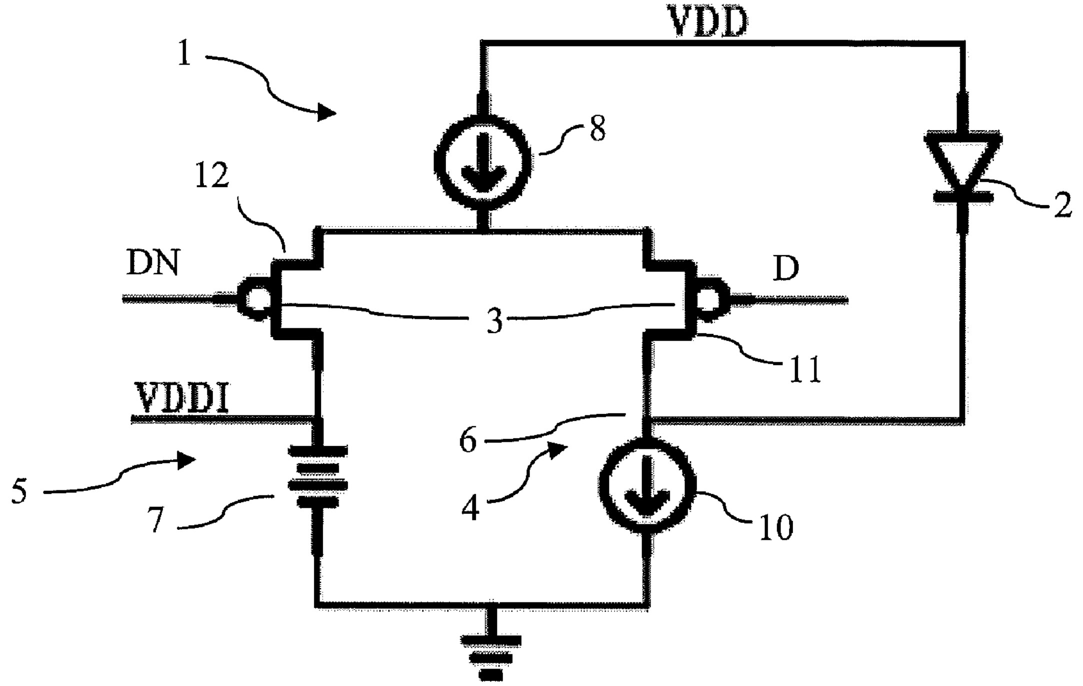
FIG. 5 shows a driver circuit according to the invention based on P-channel MOSFET transistors.

FIG. 5 shows an embodiment of a driver circuit according the invention based on P-channel MOSFET transistors 11 and 12. When D is high (and DN is low) the gate of the transistor 11 opens the path from source to drain and the reverse is true for the transistor 12. This drives the current from the modulation current source 8 through the second branch 5 allowing it to charge the charge storage device 7, while the current from the offset current source 10 is pulled through the light emitter 2. When D is low (and DN is high) the gate of the transistor 11 close the path from source to drain and the reverse is true for the transistor 12. This drive the modulation current from the modulation current source 8 through the transistor while only $I_{OFFSET}-I_{MOD}$ is driven through the light emitter. For the current driven through the light emitter to toggle between $I_{BIAS}+I_{MOD}$ and $I_{BIAS}$, $I_{OFFSET}=I_{BIAS}+I_{MOD}$. The charge storage device is charged during transmission of 1s and the current consumption corresponds to that of the embodiment shown in FIG. 3.

Figure 6:
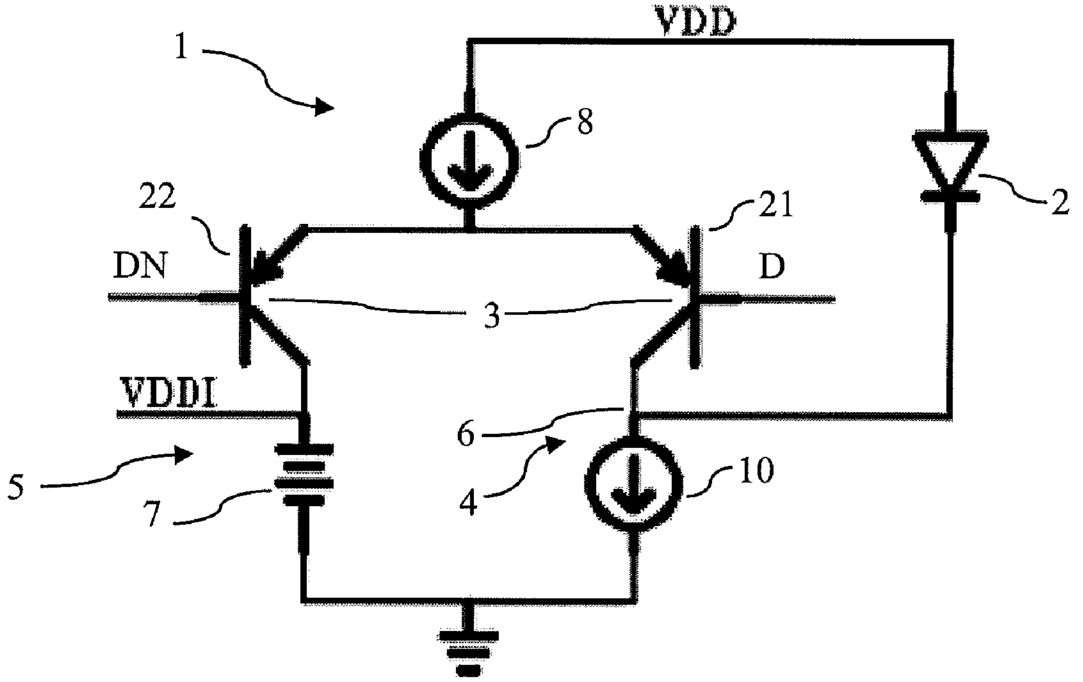
FIG. 6 shows a driver circuit according to the invention based on PNP bipolar transistors.

FIG. 6 shows an embodiment of a driver circuit according the invention based on P-type bipolar transistors 21 and 22. Relative to the embodiment shown in FIG. 3 the functionality is substantially similar mutatis mutandis features relating to the transistor type.

Figure 7:
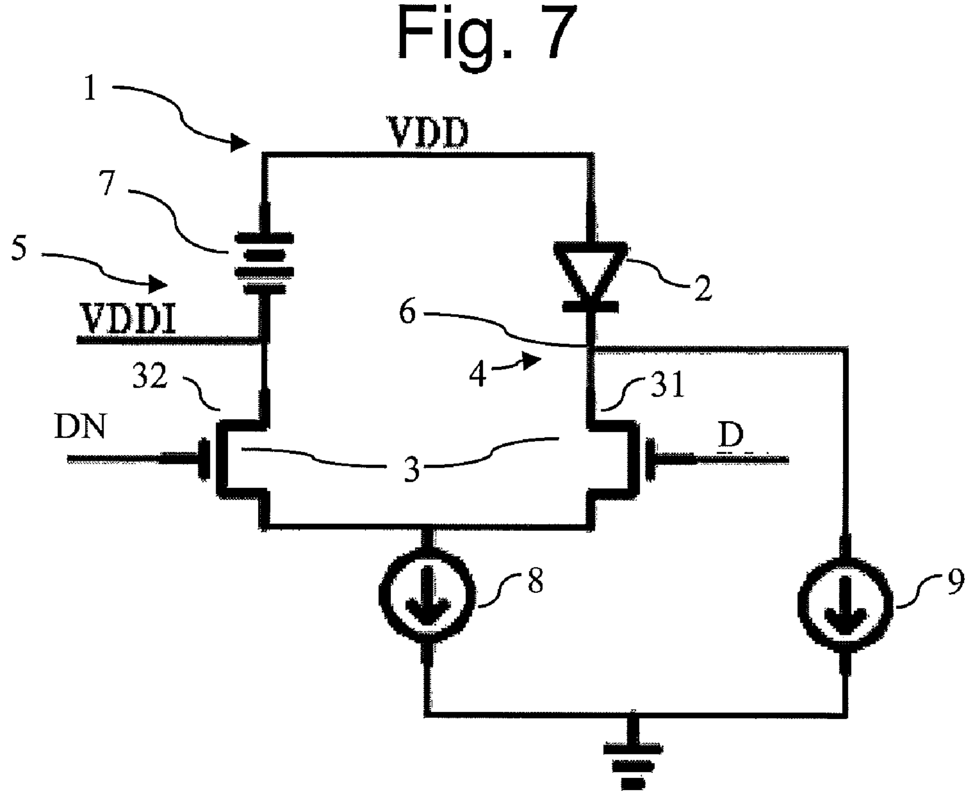
FIG. 7 shows a driver circuit according to the invention based on N-channel MOSFET transistors.
Figure 8:
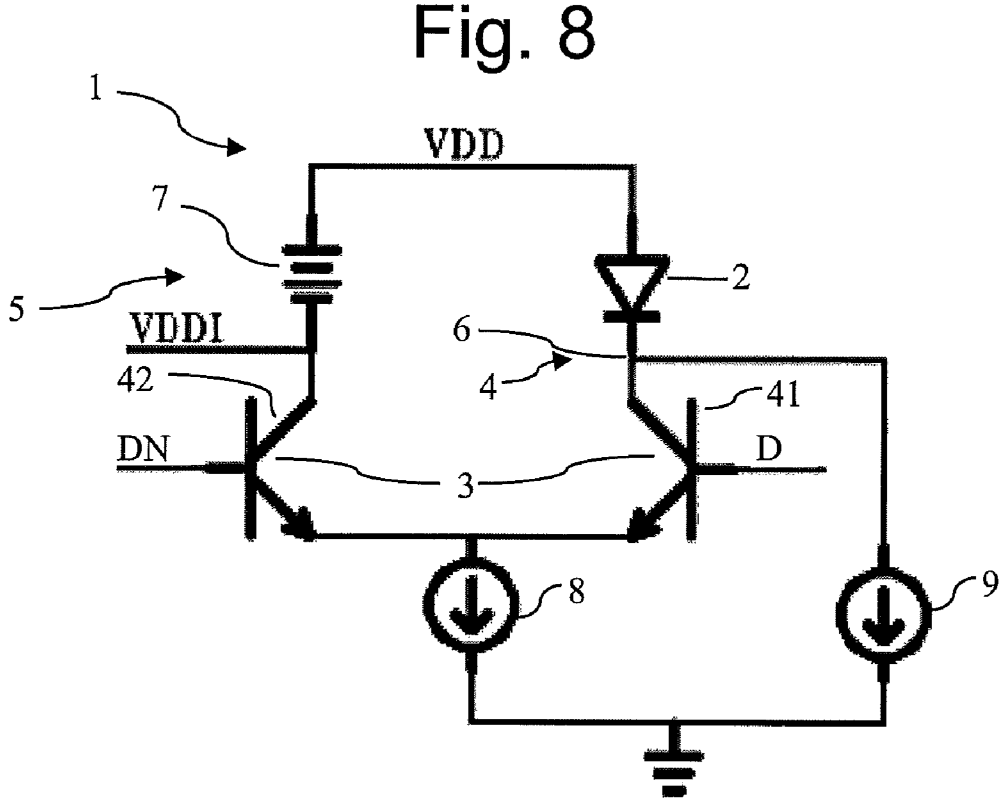
FIG. 8 shows a driver circuit according to the invention based on NPN bipolar transistors.

FIG. 7 shows an embodiment of a driver circuit according the invention based on P-channel MOSFET transistors 11 and 12. When D is high (and DN is low) the gate of the transistor 31 opens the path from source to drain and the reverse is true for the transistor 32. This pulls the current from the modulation current source 8 through the light emitter 2 and the transistor 31 while the current source 9 pulls the offset current through the light emitter. When D is low (and DN is high) the gate of the transistor 31 closes the path from source to drain and the reverse is true for the transistor 32. This pulls the current from the modulation current source 8 through the second branch and allows the charge storage device to charge while the current source 9 pulls the offset current through the light emitter. For the current driven through the light emitter to toggle between $I_{BIAS}+I_{MOD}$ and $I_{BIAS}$, $I_{OFFSET}=I_{BIAS}$. The charge storage device is charged during transmission of 0s and the current consumption corresponds to that of the embodiment shown in FIG. 1.

For the driver circuits of FIGS. 5 to 8 the light emitter as connected to the positive supply at the anode. In one embodiment the driver circuit is applied to drive a light emitter array with common anode such as a VCSEL array.

Figure 9:
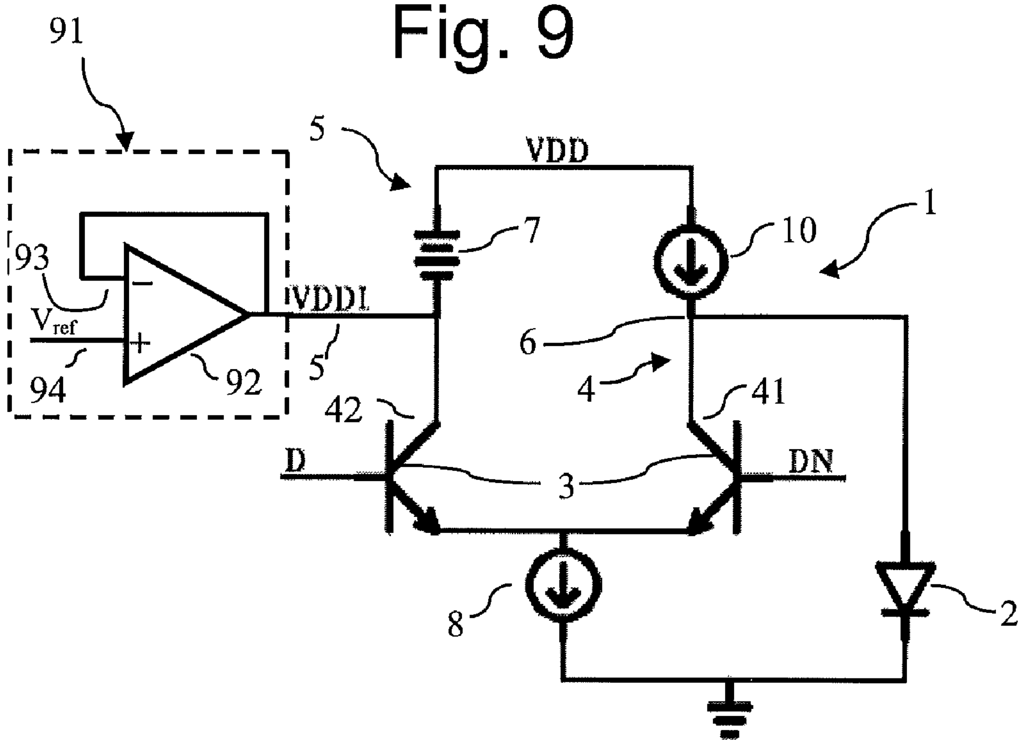
FIG. 9 shows a driver circuit according to the invention comprising a regulator arranged to influence VDDI.

FIG. 9 shows the circuit of FIG. 4 further comprising a regulator device 91. The regulator is exemplified by an operational amplifier 92 where the potential of VDDI is coupled to the inverting input 93 and a voltage reference $V_{ref}$ is connected to the non-inverting input 94. In this configuration the operation operational amplifier will function to maintain VDDI substantially equal to $V_{ref}$. As previously discussed the upper bandwidth of the regulator 91 is in one embodiment less than the upper signal bandwidth so that the regulator does not respond to variations at the rate of the signal variations. In one embodiment the upper bandwidth of the regulator is partly determined by the charge storage device. A higher upper bandwidth may allow the regulator to hold VDDI within a narrower interval but due to the current consumption of the regulator the power saving of implementing the charge storage device may be reduced. As will be evident to a person skilled in the art, a regulator device may also be incorporated into other embodiments of the invention such as those shown in FIGS. 1 to 8.

Figure 10:
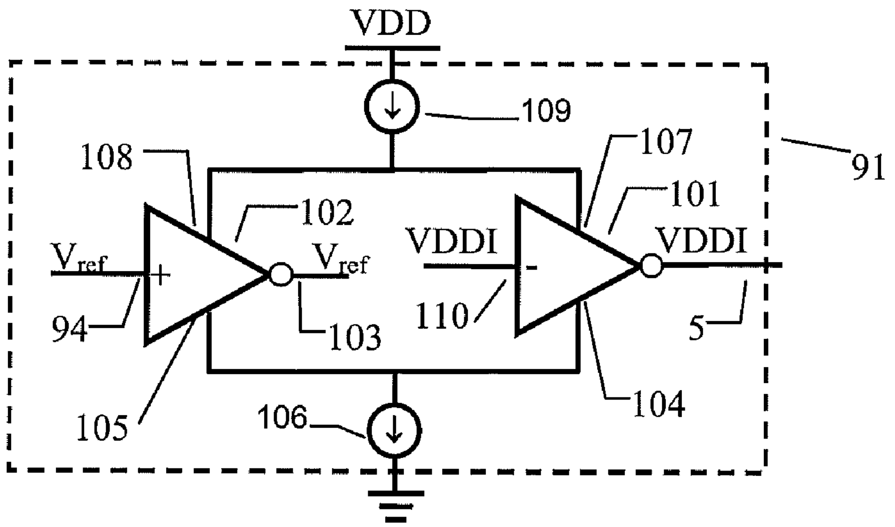
FIG. 10 shows an alternative design of the regulator of FIG. 9.

FIG. 10 shows an exemplified embodiment of a regulator device 91. Two inverting amplifiers 101 and 102 are coupled to $V_{ref}$ and VDDI respectively and the inverting amplifier 101 may be coupled to a driver circuit via the node 5. It should be noted that the "+" and "−" signs of 101 and 102 are included to clarify the functional correspondence to the operational amplifier 92 of FIG. 9. The positive supply port 107 of the inverting amplifier 101 is connected to the positive supply port 108 of the inverting amplifier 102 and a current source 109 referenced to VDD. Similarly the negative supply ports 104 and 105 of 101 and 102 are connected and commonly connected to a current source 106 referenced to GROUND. This implementation of the regulator provides essentially the same functionality of the regulator of FIG. 9.

The invention claimed is:

1. An integrated driver circuit suitable for driving a light emitter with a signal current (I(time)) based on a received signal; said circuit comprising a differential stage, said differential stage comprising two current sources and a differential pair of transistors having a first transistor and a second transistor each respectively forming part of a first branch and a second branch, said first branch comprises a first node suitable for connecting to said light emitter and/or said first branch comprises said light emitter, wherein said second branch comprises at least one charge storage device suitable for supplying current to one or more external components and a second node connected to the charge storage device for supplying said one or more external components with current accumulated in said charge storage device, said second node arranged to reside at a potential (VDDI);

and said driver circuit further comprising a regulator as an external component to said differential stage, said regulator being arranged to influence the potential (VDDI).

2. The integrated driver circuit of claim 1 wherein said current sources comprise a modulation current source and an offset current source.

3. The integrated driver circuit of claim 2 wherein said charge storage device is connected in series with said modulation current source.

4. The integrated driver circuit of claim 2 wherein said differential pair of transistors is connected in series with said modulation current source.

5. The integrated driver circuit of claim 1 where said circuit is arranged to operate substantially as a binary driver circuit wherein one of said first and second transistors is substantially active only when the other transistor is substantially inactive.

6. The integrated driver circuit of claim 1 wherein said differential pair is connected in series with one of said current sources.

7. The integrated driver circuit of claim 1 where said charge storage device is connected to a reference voltage.

8. The integrated driver circuit of claim 1 wherein said driver circuit is arranged to receive a supply current ($I_{sup}$(time)) where said circuit is arranged so that at least part of the current ($I_{sup}$(time)−I(time)) charges said charge storage device.

9. The integrated driver circuit of claim 8, wherein said at least part of the current ($I_{sup}$(time)−(time)) is zero in time segments.

10. The integrated driver circuit of claim 1 where said driver is arranged to provide a binary current to said light emitter having a low value and a high value and said charge storage device is arranged to be primarily charged when said low value is supplied to the light emitter.

11. The integrated driver circuit of claim 10 wherein primarily is taken to mean that the ratio of the current supplied to said charge storage device when it is not being primarily charged relative to the current supplied to said charge storage device when it is being primarily charged is equal to or less than $10^{-1}$.

12. The integrated driver circuit of any of the preceding claims where said driver circuit is suitable for providing a signal current having an upper bandwidth equal to or exceeding 1 GHz.

13. The integrated driver circuit of claim 1 where said driver is arranged to provide a binary current to said light emitter having a low value and a high value and said charge storage device is arranged to be primarily charged when said high value is supplied to the light emitter.

14. The integrated driver circuit of claim 1 where said driver circuit is suitable for providing a signal current having an lower bandwidth of less than or equal to 500 Hz.

15. The integrated driver circuit of claim 1 where said driver circuit is suitable for providing a signal current comprising a binary signal of 1 Gbit or more.

16. The integrated driver circuit according to claim 1 where said driver circuit is arranged so that during operation the potential (VDDI) resides within a potential interval.

17. The integrated driver circuit of claim 1 wherein said driver circuit is arranged so that during operation the potential (VDDI) varies less than 20%.

18. The integrated driver circuit of claim 1 wherein the regulator is connected in parallel to said charge storage device, said regulator being arranged to influence the potential (VDDI).

19. The integrated driver circuit of claim 1 wherein said regulator is a voltage regulator and/or a current regulator.

20. The integrated driver circuit of claim 1 wherein said regulator is constructed as a voltage follower.

21. The integrated driver circuit of claim 1 wherein said regulator in connected to a set of current sub-sources which is digitally controlled.

22. The integrated driver circuit of claim 1 wherein said regulator is arranged to regulate based on one or more measurements selected from the group of the potential (VDDI), the current in the first branch, the current in the second branch, the signal current, potential over the light emitter, potential at the base of said first transistor, potential at the base of said second transistor.

23. The integrated driver circuit of claim 1 wherein an upper bandwidth of said regulator is arranged to be substantially less than the upper bandwidth of the signal current.

24. The integrated driver circuit of claim 1 wherein bandwidth of said regulator is less than or substantially equal to 500 kHz.

25. The integrated driver circuit of claim 1 wherein type of said transistors are selected from the group of PMOS, NMOS, NPN and PNP.

26. The integrated driver circuit of claim 1 wherein said charge storage device comprises one or more of the group including a capacitor, a battery and an inductor.

27. The integrated driver circuit of claim 1 wherein said light emitter is selected from the group of VCSEL, a photodiode, a laser, a laser diode and a Mach-Zender modulator.

28. A chip comprising an integrated driver circuit according to claim 1, wherein said one or more of said external component(s) are in electrical communication with said first and/or second transistors.

29. The chip of claim 28 where at least one of said external components functions as a pre-processor.

30. The chip of claim 28 where said external components comprise all pre-processor components of said chip relating to said driver circuit.

31. The chip of claim 28 where said external component(s) requires a supply current ($I_{req}$) wherein said charge storage device is arranged to provide all or part of said supply current ($I_{req}$).

32. The chip of claim 28 wherein said one or more external component(s) comprises component(s) not in electrical communication with said driver circuit.

33. The chip of claim 28 where, during operation, said light emitter is arranged to have a current requirement ($I_{req,emit}$) and said chip is arranged to have a current requirement ($I_{req,chip}$), where the current requirement of the chip is less than or equal to the current requirement of the light emitter plus 30% ($I_{req,chip} \leqq 1.3 I_{req,emit}$).

34. The chip of claim 28 said chip comprising a driver portion where, during operation, said light emitter is arranged to have a current requirement ($I_{req,emit}$) and the driver portion of said chip is arranged to have a current requirement ($I_{req,chip}$), where the current requirement of the driver portion is less than or equal to the current requirement of the light emitter plus 30% ($I_{req,chip} \leqq 1.3 I_{req,emit}$).

35. A system comprising a light emitter, one or more components suitable for providing a signal and an integrated driver circuit according to claim 1.

36. The system of claim 35 wherein one or more of said driver circuit, said light emitter, said component(s) suitable for providing a signal are integrated on a common chip.

37. The system of claim 35 wherein said system forms at least part of an optical interconnect.

38. The integrated driver circuit of claim 1 wherein said charge storage device is connected in series with said second transistor.

* * * * *